Dec. 17, 1929.    A. C. HOOPER ET AL    1,740,015
SPRINKLER VALVE
Filed May 18, 1927
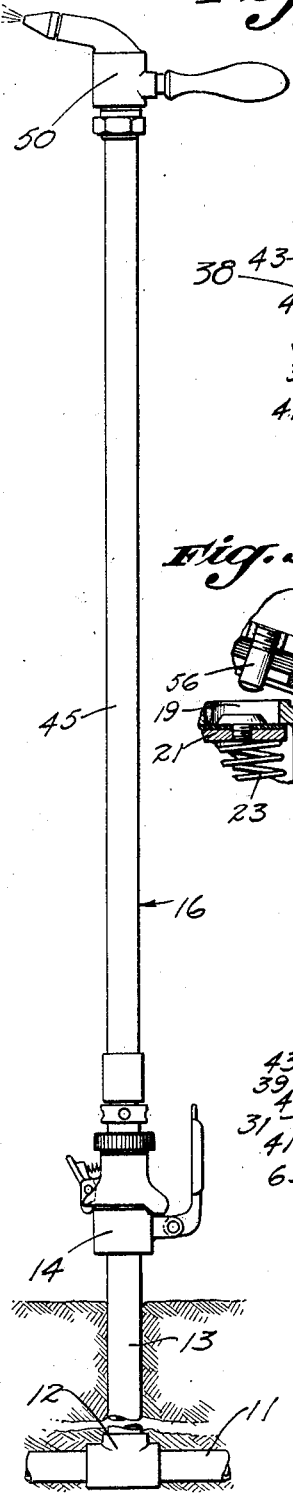
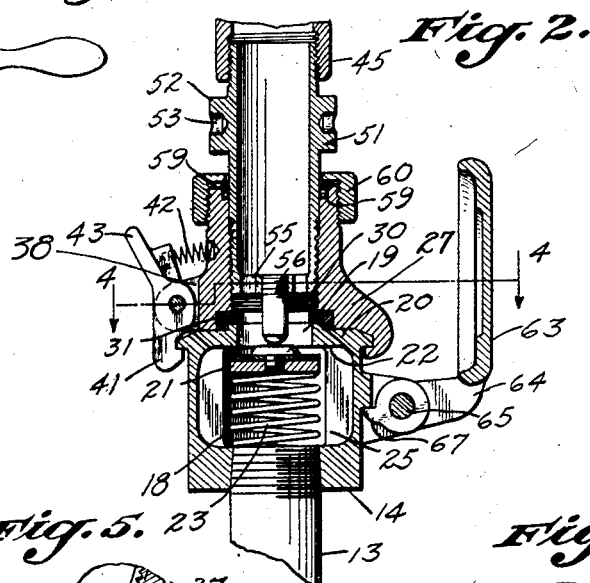
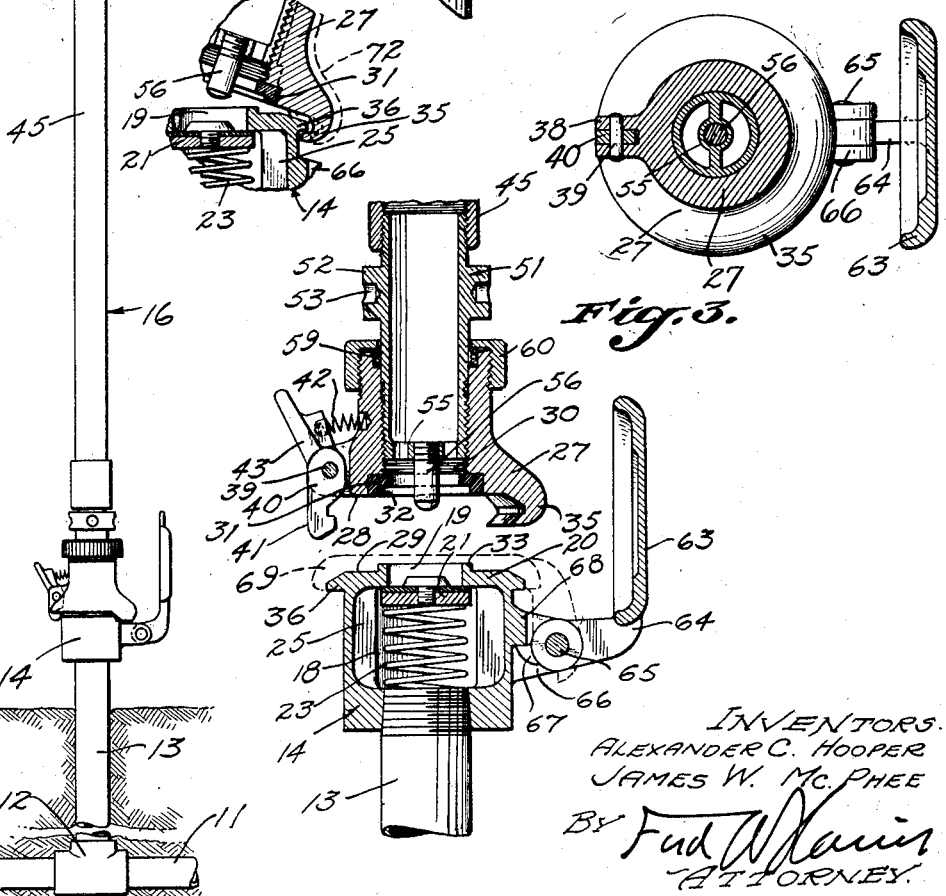
INVENTORS.
ALEXANDER C. HOOPER
JAMES W. McPHEE
By Fred W. Lewis
ATTORNEY.

Patented Dec. 17, 1929

1,740,015

UNITED STATES PATENT OFFICE

ALEXANDER C. HOOPER, OF PASADENA, AND JAMES W. McPHEE, OF LONG BEACH, CALIFORNIA, ASSIGNORS TO THE SNAP VALVE CORPORATION, A CORPORATION OF CALIFORNIA

SPRINKLER VALVE

Application filed May 18, 1927. Serial No. 192,323.

This invention relates to that type of irrigation system having underground pipes from which vertical connection-members extend to points above the surface of the ground; and having a sprinkler-unit which may be attached to any of the connection-members. The connection-members have valves which close ports thereof when the sprinkler-unit is not in place. Means is usually provided in the sprinkler-unit whereby the valve may be opened so that water will flow therethrough and irrigation of the surrounding area may be accomplished.

An object of this invention is to provide a combination of the general character pointed out above in which the valve of the connection-member is automatically opened when the sprinkler-unit is installed thereon.

The foregoing object of our invention is accomplished by providing the sprinkler-unit with an engager which engages the valve and unseats it. In the typical irrigation system of this character the water-pressure at different points is different because of the friction head in the pipes and consequently the valves of the different connection-members must open a greater or lesser degree in accordance with the pressure thereat. Another reason why it is desirable to have different valves open different amounts is that sometimes one connection-member must take care of the irrigation of a slightly larger or smaller area than another connection-member.

It is one of the objects of this invention to provide a combination of the general character specified in which the valves of the different connection-members may be opened different amounts.

The object just specified is accomplished by making the engager of the invention projectible so that if a particular valve is to be opened more, the engager is projected. On the other hand, if a particular valve is to be opened less the engager is retracted.

A still further object of our invention is to provide a combination of the general character specified in which the sprinkler-unit is easily installed on and removed from the connection-members.

Other objects of our invention will be explained in the course of the following description.

Our invention may be best understood by referring to the accompanying drawing in which, Fig. 1 is a vertical view illustrating the entire invention.

Fig. 2 is a vertical section taken through the main parts of the invention.

Fig. 3 is a vertical section similar to Fig. 2 but showing the parts in separated position.

Fig. 4 is a section taken on the line 4—4 of Fig. 2.

Fig. 5 is a fragmentary detail illustrating the manner in which the sprinkler-unit is attached to one of the connection-members.

Referring to the drawing in detail, the sprinkler-head provides underground header-pipes 11 having T fittings 12. The T fittings 12 have vertical pipes 13 connected thereto, at the upper end of which pipe 13 is the body 14 of the invention which is the connection-member thereof. Attached to the connection-member 14 is the nozzle-unit 16 of this invention.

For a detailed description of the parts, let us refer to Figs. 2 to 4 inclusive. The body 14 provides a chamber 18 which is in communication with the interior of the pipe 13. The upper part of the chamber 18 is connected to the exterior of the body 14 by means of a port 19 which extends through a top wall 20 of the body 14. Situated in the chamber 18 is a valve 21 which is urged against a seating face 22 of the wall 20 by means of a compression-spring 23. Surrounding the valve 21 and the compression-spring 23 is a plurality of guide-webs 25 which act as centralizing means for these two parts.

The sprinkler-unit 16 has a head-member 27 which has a lower face 28 adapted to contact an upper face 29 of the body 14. This head-member 27 has a passage 30 which is adapted to be communicated with the port 19. Surrounding the lower end of the passage 30 is a gasket 31 which forms a seal at the juncture of the faces 28 and 29 for preventing leakage. The gasket has an annular countersink 32 which is adapted to receive an annular lip 33 which projects upward from the upper wall 20 of the body 14 and assists in making a tight seal.

Extended from one side of the head-member 27 is a hook 35 which is adapted to extend around an annular shoulder 36 which is formed on the body 14 in the plane of the top wall 20. On the opposite side of the head-member 27 is a pair of lugs 38 which carry a pin 39 on which a latch 40 is pivoted. The latch 40 has a hook-end 41 which is adapted to extend around a portion of the annular shoulder 36 and hold the head-member 27 in the position shown in Fig. 2, and so that a tight seal is provided between the body 14 and the head-member 27. The latch 40 is resiliently retained in latching position by means of a compression-spring 42 and may be released from this position by a manual engagement with an arm 43.

The head-member 27 is adapted to support a discharge-member consisting of a column-pipe 45 and a sprinkler-head 50 situated at the upper end of the column-pipe. The column-pipe 45 includes a lower member 51 which is screwed into the passage 30. The member 51 at a point slightly above the head-member 27 is provided with a boss 52 having sockets 53 for the reception of a wrench whereby the entire discharge-member may be rotated so as to screw the member 51 into or out of the passage 30. The lower end of the member 51 is provided with a spider 55 which carries an engager 56. The engager 56 projects downward from the lower end of the passage 30, and when the sprinkler-unit is installed on the connection-member 14 engages the valve 21 and removes it from its seat. In view of the fact that the member 51 may be moved axially in the passage 30 the engager 56 is projectible. When the member 51 is screwed downward in the passage 30 the lower end of the engager 56 rests in a lower plane relative to the head-member 27 and will therefore move the valve 21 a greater distance from its seat, and vice versa.

For the purpose of preventing leakage around the member 51 we provide packing 59 which is held in sealing position around the member 51 by means of a gland 60 which screws onto the upper part of the head-member 27.

When the sprinkler-unit is not installed on the body 14 it is desirable to enclose the port 19 so that it will be protected from being inadvertently opened and so that no foreign material may drop into this port. We provide a cover 63 which is formed integral with an arm 64. The arm 64 pivots on a shaft 65, which shaft 65 is carried by ears 66 of the body 14. When the sprinkler-unit is installed, the cover 63 rests in the position shown in full lines in the drawing, being supported in this position by means of a lug 67 which engages a shoulder 68 of the body 14. When the sprinkler-unit is removed from place the cover is swung into the position indicated by dotted lines 69 in Fig. 3.

The sprinkler-unit is very simply installed upon the connection-member or the body 14 as illustrated in Fig. 5. Fig. 5 is a fragmentary section showing that portion of the head-member 27 which carries the hook 35 and an upper portion of the body 14 which includes a part of the shoulder 36. The sprinkler-unit is lowered into such a position that the head-member 27 rests so that the hook 35 is in the position indicated by dotted lines 72 of Fig. 5. The hook-member at this time is in the same horizontal plane as the adjacent portion of the shoulder 36 but is at one side thereof. The sprinkler-unit is at this time inclined to one side so that the major axis thereof is at an angle with the major axis of the pipe 13 and the body 14. The sprinkler-unit 16 is then moved bodily to the left so that the hook 35 extends around the adjacent portion of the shoulder 36. When in this position it will be seen that the engager 56 has not yet engaged the valve 21. The next operation is to quickly swing the sprinkler-unit from the full line position in Fig. 5 into the position in which it is shown in Fig. 2. The engager 56 at this time contacts the valve 21 and disengages it. At the same time the hook-end of the latch 40 engages the upper face of the annular shoulder 36 and is swung outward so that it will move by the annular shoulder and thereafter swing into latching position as illustrated in Fig. 2. It should be understood that this swinging of the sprinkler-head is done very quickly and that it moves into installed position with such rapidity that there will be substantially no leakage of water even though the valve 21 is unseated simultaneously with the swinging of the spray member into installed position.

If the stream of water issuing from the sprinkler-head 50 is not proper, the entire discharge-member is rotated so that the position of the engager 56 is adjusted. The engager 56 is either moved up or down so that the valve is positioned to allow the correct amount of water to pass from the body 14. The threads formed in the passage 30 and on the member 51 are loose enough to permit an easy rotation of the discharge-member. For this reason we provide the packing means which assures a seal and no leakage from the passage 30 around the member 51.

From the foregoing description it will be evident that the invention is very suitable for use in irrigating large areas where it is necessary to either compensate for the difference in water-pressure in the underground piping of the system or difference in size of the area, the irrigation of which is to be done from a single connection-member. The construction is designed so that the sprinkler-unit may be installed without spraying water on the operator.

We claim as our invention:

1. In combination with a connection-member having a port and a valve seating against said port for closing same, a sprinkler-unit comprising: a head-member adapted to fit against said connection-member, having a passage adapted to communicate with said port; a discharge-member adjustably carried by said head-member; and an engager carried by said discharge-member in said passage, said engager being adapted to engage and unseat said valve when said sprinkler unit is installed on said connection-member, the position of said engager being changed by adjusting said discharge member.

2. A combination as defined in claim 1 in which packing is provided around said discharge-member to prevent leakage therearound from said passage.

3. In combination with a connection-member having a port and a valve seating against said port for closing same, a sprinkler-unit comprising: a head-member adapted to fit against said connection-member, having a passage adapted to communicate with said port; a discharge-member extending from said head-member; an engager carried in said passage adapted to engage and unseat said valve when said sprinkler-unit is installed on said connection-member; a shoulder formed on the upper part of said connection-member; a hook on said head-member adapted to extend around said shoulder; and a swingable latch carried by said head-member adapted to extend around said shoulder.

4. In combination with a connection-member having a port and a valve seating against said port for closing same, a sprinkler-unit comprising: a head-member adapted to fit against said connection-member, having a passage adapted to communicate with said port; an engager carried in said passage adapted to engage and unseat said valve when said sprinkler-unit is installed on said connection-member; and means for supporting said engager, said means being adjustable from the exterior so that the position of said engager may be changed while said head-member is installed on said connection member.

5. In combination with a connection-member having a port and a valve seating against said port for closing same, a sprinkler-unit comprising: a head-member adapted to fit against said connection-member, having a passage adapted to communicate with said port; an engager carried in said passage adapted to engage and unseat said valve when said sprinkler-unit is installed on said connection-member; and means screwed into said passage of said head-member for supporting said engager, said means being adjustable from the exterior so that the position of said engager may be changed while said head-member is installed on said connection member.

In testimony whereof, we have hereunto set our hands at Long Beach, California, this 11th day of May, 1927.

ALEXANDER C. HOOPER.
JAMES W. McPHEE.